United States Patent [19]

Willinger

[11] 4,192,255
[45] Mar. 11, 1980

[54] AQUARIUM AIRSTONE DEVICE

[75] Inventor: Allan H. Willinger, New York, N.Y.

[73] Assignee: Willinger Bros., Inc., New York, N.Y.

[21] Appl. No.: 940,259

[22] Filed: Sep. 7, 1978

[51] Int. Cl.² ............................................. A01K 63/00
[52] U.S. Cl. ........................................................ 119/5
[58] Field of Search .................... 119/3, 5; 261/77; 210/220, 221 P; 239/45; 43/56

[56] References Cited

U.S. PATENT DOCUMENTS

| | | | |
|---|---|---|---|
| 1,945,962 | 2/1934 | Arneth | 119/5 X |
| 2,774,585 | 12/1956 | Wirts | 210/220 X |
| 3,261,471 | 7/1966 | Halpert | 119/5 X |
| 3,347,537 | 10/1967 | Morgan | 210/220 X |
| 3,374,771 | 3/1968 | Michie et al. | 119/5 |
| 3,507,253 | 4/1970 | Willinger | 119/5 |
| 3,720,318 | 3/1973 | Cohen | 119/5 X |

FOREIGN PATENT DOCUMENTS 571970 1/1958 Italy .......................................... 210/220

*Primary Examiner*—Louis G. Mancene
*Assistant Examiner*—Robert P. Swiatek
*Attorney, Agent, or Firm*—Friedman, Goodman & Teitelbaum

[57] ABSTRACT

An aquarium device for use in an aquarium tank, the device includes two cylindrical airstones each having a nozzle with an end portion thereof secured within a bore of the airstone and an opposing stem portion thereof extending from the airstone. A T-shaped connector includes a tubular central portion for receiving the stem portions on the nozzles of the two airstones. A connecting stem portion extends from the central portion of the connector for coupling to an air hose. The stem portions on the nozzles of the airstones and the connecting stem portion on the connector are substantially identical in shape, whereby the airstones can be used as a pair in conjunction with the connector, or individually by directly connecting the airstone to the air hose.

15 Claims, 8 Drawing Figures

AQUARIUM AIRSTONE DEVICE

BACKGROUND OF THE INVENTION

This invention relates to aquarium devices, and more particularly to airstones for connection to an air hose and placement in an aquarium tank.

In most aquariums, a filter system is utilized to purify the water in the aquarium and at the same time to aerate the water. Generally, an airstone is used either by itself or in conjunction with a complete filtering system in order to achieve these goals. The airstone is connected to an air hose and is positioned adjacent the bottom or lower portion of the aquarium tank above the sand or gravel therein. Air is pumped in a conventional manner through the air hose and passes through the airstone which provides a dispersed area of air bubbles which enter into the water to provide the necessary air for the fish.

Airstones can be utilized by themselves in order to provide the necessary aeration. Additionally, they are frequently incorporated into a complete filtering system whereby, as the air passes from the airstone into the aquarium, the water from the aquarium passes through the filter to remove contaminants from the water where only the filtered water is aerated and returned to active use in the tank.

One of the problems in utilizing an airstone concerns maintaining its position adjacent the bottom or lower portion of the aquarium tank. Generally, the airstone itself is of sand material bonded together by a suitable adhesive. As the air passes therethrough, it tends to cause the airstone to become buoyant, so that frequently the airstone will float upwardly from its position in the tank. When the airstone is utilized in a complete filtering system, the weight of the filter will compensate for the tendency of the airstone to float upwardly and the filter will ensure the retention of the airstone adjacent the lower portion of the tank. However, when the airstone is utilized independently of a filtering system, it is frequently necessary to utilize compensatory devices to ensure the positioning of the airstone at the bottom of the tank. For example, frequently additional weighted material will be added to the airstone to provide sufficient weight to keep the airstone at the bottom of the tank. At other times the size of the airstone is increased purposely to provide sufficient material to give it the weight needed to keep it at the bottom of the tank. However, by adding additional weight, such as by increasing the length of the airstone, there results a tendency of the airstone itself to break due to the brittle characteristic of the airstone.

An additional problem with existing airstones is that as the air from the hose enters into the airstone, contaminants may be carried along with the flow of air and thus may clog the passage of the air at its entrance into the airstone. As a result, little air will pass through the airstone and insufficient aeration will be achieved for the aquarium tank.

Another problem concerns the sufficiency of the area providing aeration. In order to provide a proper mixture of the air throughout the aquarium tank, a large surface producing the air bubbles is desirous. However, with a conventional cylindrical airstone, only a limited amount of surface is provided, whereby a rather small wall of air bubbles is sent into the aquarium tank. For large aquarium tanks, this wall of air bubbles is insufficient to provide the needed aeration of the tank.

Additional problems with existing airstones concern the coupling arrangement between the air hose and the airstone. With existing airstones, a nozzle extending from the airstone is connected to the air hose. Existing airstones are generally cylindrical in shape and are maintained in an upright vertical position when connected to the air hose. This vertical position does not provide a large lateral dispersion of the air bubbles into the aquarium tank, and this reduces the distribution of the air bubbles within the aquarium tank.

A further problem concerns the appropriate packaging and storage of the airstones during shipment and display thereof. The airstones are frequently packaged individually. Because the airstone material is brittle and easily breakable, the packaging must provide necessary reenforcement to avoid breakage and crushing of the airstone, which increases the costs of packaging and shipment thereof.

SUMMARY OF THE INVENTION

Accordingly, it is an object of the present invention to provide an improved airstone arrangement for aquarium tanks.

A further object of the present invention is to provide an improved airstone arrangement for use in aquarium tanks which avoids the aforementioned problems of prior art devices.

Yet a further object of the present invention is to provide an airstone arrangement utilizing two airstones which can be used either in combination or individually, as is desired.

Still another object of the present invention is to provide an airstone arrangement which utilizes two substantially identical airstones interconnected by a T-connection which permits use of the airstones individually or jointly.

A further object of the present invention is to provide an improved connection between an airstone and an air hose supply, which connection includes a notched nozzle to prevent clogging of the passageway between the air supply and the airstone.

Yet a further object of the present invention is to provide an airstone arrangement for use in aquarium tanks, which arrangement utilizes superior material to provide improved coupling between the airstone and the air hose.

An additional object of the present invention is to provide an airstone arrangement which permits improved packaging and storage of the airstones for shipment and display.

A further object of the present invention is to provide an airstone arrangement which includes an improved packaging therefor, which packaging avoids the crushing and breakage of the airstone itself.

Briefly, the present invention comprises an airstone arrangement for use in an aquarium tank. The arrangement includes two airstones each having a nozzle extending therefrom. A T-shaped connector interconnects the two airstones. The T-shaped connector includes a tubular central portion which receives the airstone nozzles at its respective outer ends. A tubular stem portion extends from the central portion of the connector and is available for coupling to an air hose. Air entering the tubular stem is thereby directed to both airstones.

In an embodiment of the present invention, the tubular stem portion of the connector is formed in a frustroconical shape whereby it can easily be coupled to the air hose. At the same time, each of the airstone nozzles also includes a frustroconical stem portion substantially identical in shape to the tubular stem portion of the connector. In this way, each airstone can be used individually coupled directly to the air hose, or can be used with another airstone as a pair utilizing the T-shaped connector.

In a further embodiment of the present invention, the nozzles are formed with a portion thereof extending into a bore of the airstone. At the end of the nozzle, an axially extending notch is formed in order to prevent clogging of the air entering from the air hose into the airstone.

The present invention also contemplates a packaging arrangement for such above mentioned airstones. The packaging includes a rear wall with resilient clips outwardly extending therefrom. The clips are spaced apart from each other by a dimension slightly less than the diameter of the tubular central portion of the T-shaped connector. Recesses are formed in the rear wall laterally on both sides of the resilient clips. The length of each recess is greater than the length of the airstone, though the width of each recess is less than the diameter of the airstone. In this manner, the airstone arrangement is held by means of the T-shaped connector being supported in the resilient clips. The airstones themselves will float in the recesses with the diameters of the airstones being positioned away from the rear wall of the packaging so that only minor portions of the airstones are disposed in the recesses.

The material utilized for the various nozzles, T-shaped connectors, etc. are of styrene acrilonitrile material which can include butediene in order to add additional rubber-like qualities to avoid the brittle nature of the plastic material.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

In the various figures of the drawing, like reference characters designate like parts.

DETAILED DESCRIPTION OF THE PREFERRED EMBODIMENT

Figure 1:
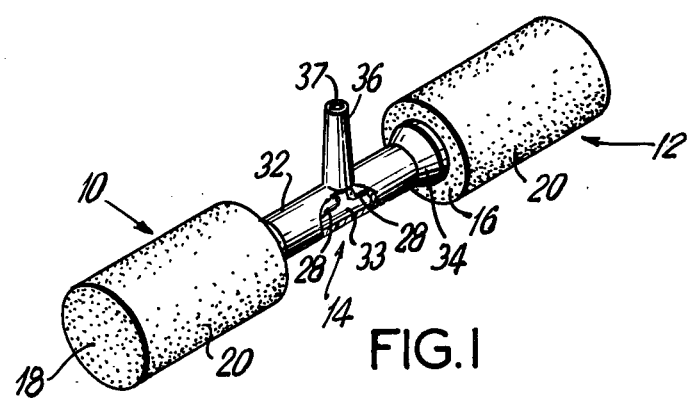
FIG. 1 is a partly fragmented perspective view of the airstone arrangement in accordance with the present invention.
Figure 2:
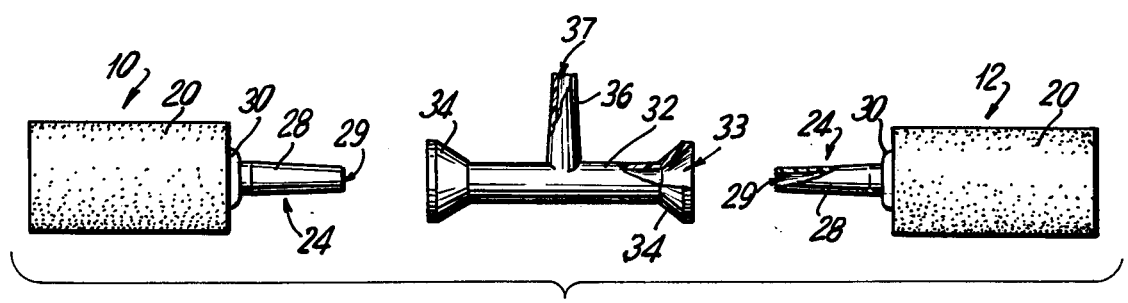
FIG. 2 is a partly fragmented exploded elevational view of the various parts forming the airstone arrangement.

Referring now to FIGS. 1–4, the airstone arrangement of the present invention comprises two individual airstones, generally designated as 10 and 12, interconnected by a T-shaped connector, generally designated as 14. Each airstone is typically shown of cylindrical configuration having an inner end wall 16 and an outer end wall 18 with a tubular solid body 20 therebetween. A bore 22 is formed in each inner end wall 16 which can receive a nozzle, shown generally as 24.

Each nozzle includes a tubular section 26 which substantially fits into the bore 22, and a frustroconical tubular stem section 28 connected to the section 26 and extending from the bore. An opening 29 extends through the tubular sections 26, 28 of the nozzle 24. The cylindrical portion 26 is generally inserted into the bore 22 and an adhesive material, such as a vinyl adhesive, is formed as a collar 30 around the nozzle to secure the nozzle to the airstone. The adhesive is generally of a material which provides a wet-proof connection. It is of course understood that other types of interconnecting arrangements between the nozzle and the airstone could be utilized.

The T-shaped connector 14 includes a tubular central portion 32 having opposed open ends for receiving respectively the nozzles 24 extending from the two airstones 10, 12, where an opening 33 extends through the portion 32 from one end to the opposite end. In order to provide a secure fit between the T-shaped connector and the airstones, each end of the central portion includes a bell shaped portion 34 which fits over the collar 30 of adhesive material and provides a tight fit between the nozzle and the T-shaped connectors. Extending upwardly from the tubular central portion 32 is a stem portion 36 of frustroconical tubular shape. It should be noted, that the frustroconical stem section or portion 28 of each nozzle is substantially identical to the frustroconical stem portion 36 of the T-shaped connector. An opening 37 extends through the stem portion 36 to be in flow communication with the opening 33 in portion 32. It is noted, that when the nozzles of the two airstones are inserted into the opposite ends of the opening 33, the stem sections 28 are spaced apart, as indicated in FIG. 1, to allow the air to enter each stem section 28.

Figure 5:
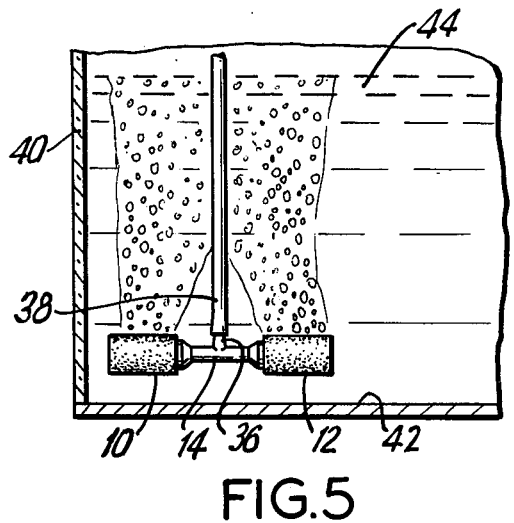
FIG. 5 is a sectional view of a portion of an aquarium tank utilizing the airstone arrangement in accordance with the present invention.

The airstone arrangement can be utilized as shown in FIG. 5. The two airstones 10 and 12 are interconnected to the T-shaped connector 14. The frustroconical stem 36 is inserted into a tubular air hose 38. Air is pumped in a conventional manner into the air hose 38 and passes through the openings 37, 33 of the T-shaped connector to the openings 29 of the stem sections 28, and through the cylindrical portions 26 of the nozzles 24 to the two airstones 10 and 12. The air then passes upwardly from the airstones. The airstone arrangement is placed in the aquarium tank 40 adjacent the bottom 42 thereof, being placed within the water 44 to provide sufficient aeration to the water. It should be noted, that in the arrangement as shown, the airstones are positioned with their elongated axes parallel to the bottom of the aquarium tank. As a result, a wider surface of air bubbles is provided from the airstones which can enter into the water. Furthermore, it should be noted that as the column of air passes upwardly from each of the airstones, it tends to co-mingle into a single continuous wall of air bubbles as it moves upwardly in the water in the aquarium tank.

This provides a much larger source of air and permits better dissemination and distribution of the air in the water in the aquarium tank. As a result, a more even distribution of air will be provided throughout the water in the tank.

Utilizing the arrangement shown in FIG. 5 it will be noted that two airstones are provided in conjunction with the T-shaped connector. Utilization of this arrangement will provide sufficient weight to maintain the airstones in position near the bottom of the aquarium tank, or where ever so placed, without having the airstone floating upwardly, as is common with prior art devices.

Figure 6:
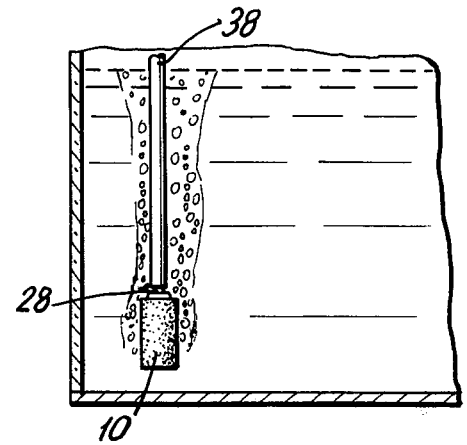
FIG. 6 is a sectional view of a portion of an aquarium tank utilizing a single airstone of the airstone arrangement of the present invention.

Although the arrangement provides for the use of two airstones, frequently it will be desired to utilize a single air stone either alone or in combination with a filtering system. As was described, each airstone includes a nozzle 24 extending therefrom. The nozzle 24 from the airstone is of substantially identical shape to the stem portion 36 extending from the T-shaped connector 14. As a result, just as the stem portion from the T-shaped connector can be coupled to an air hose, the nozzle 24 extending from each airstone can also be directly coupled to the air hose 38. Specifically, as is shown in FIG. 6, a single airstone 10 is shown having its nozzle stem section 28 directly coupled to the air hose 38. It is therefore appreciated that the airstones can be either used individually by directly connecting them to an air hose, or as a pair by means of the T-shaped connection, where two of them are simultaneously coupled to the air hose.

By utilizing the two airstones together, the problem of having a clogged airstone will be delayed so that the two airstones will take twice as long as the prior art airstone to clog. If the air includes some contaminant, it will flow through the air hose and block the entrance to the airhose, which would prevent sufficient air from passing through that airstone and completely eliminate the source of air to the tank water. Furthermore, the tank water itself contains contaminants which will clog the airstone.

Figure 3:
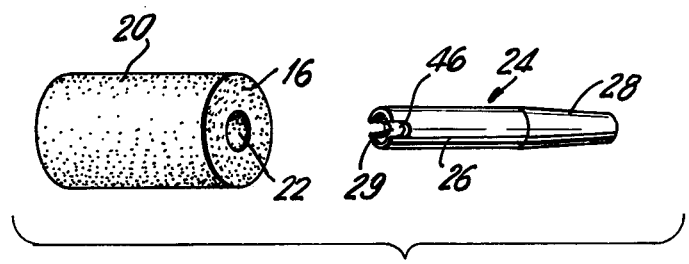
FIG. 3 is an exploded perspective view of a single airstone and nozzle therefor.
Figure 4:
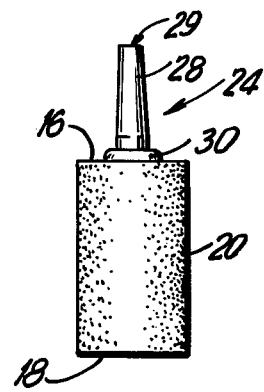
FIG. 4 is an elevational view of a single airstone with its nozzle connection.

In order to further alleviate the clogging problem, an additional feature is provided at the interconnection between the nozzle and the airstone. As shown in FIG. 3, at the inner end of the cylindrical portion 26 of the nozzle 24, there are provided axially extending notches 46 which extend through diametrically opposed positions of the outer section of the nozzle into flow communication with the opening 29 therein. By means of these notches, even if a contaminant should enter into the nozzle, it will be prevented from clogging the entire passageway thereby still permitting a flow of air from the air hose through the airstone to aerate the aquarium tank water.

The airstone material is typically made of sand which is bonded together by means of heat and/or pressure with an adhesive material. Such adhesives are commonly available. The nozzle extending from the airstone is typically made of styrene acrilonitrile material (SAN). This is inserted into the airstone and secured by means of the plastic vinyl adhesive material 30, or other similar types of wet-proof adhesive. The T-shaped connector is typically made of acrilonitrile butediene styrene material (ABS). The use of the additional butediene provides a rubber-like flexibility thereto, so that the T-shaped connector is less brittle. In this manner, when inserting the stem from the airstone, the stem will grip the bore of the T-shaped connector and provide a secure locking arrangement.

Figure 7:
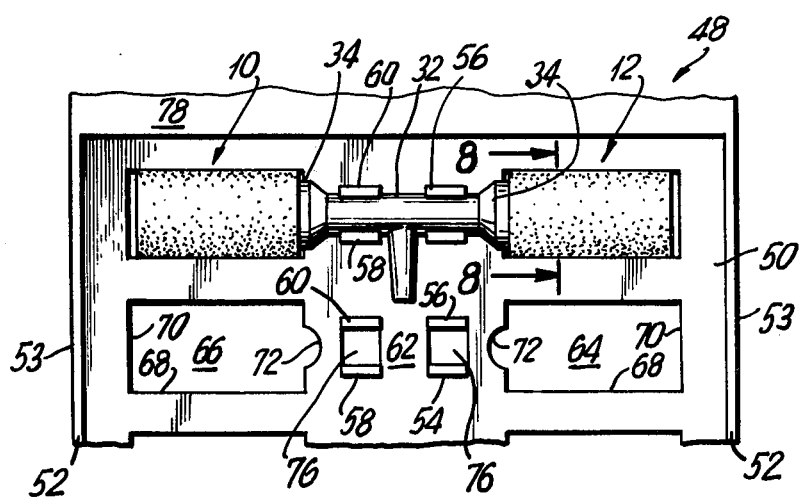
FIG. 7 is a fragmented view showing a portion of the packaging for retaining the airstone arrangement of the present invention.
Figure 8:
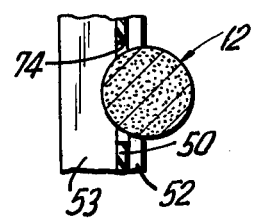
FIG. 8 is a sectional view taken along line 8—8 of FIG. 7, and showing the airstone maintained in the packaging.

In addition to providing all of the above mentioned features, the use of the airstone arrangement as described permits a unique packaging thereof which provides a display for the airstone and prevents breakage. Such packaging arrangement is shown in FIGS. 7 and 8, wherein the package shown generally at 48 includes a rear wall 50 with a perimetric edge wall 52 therearound which is connected to the side walls 53. A set of resilient clips 54, 56 is formed extending upwardly from the rear wall. The spacing between the resilient clips is such as to be a dimension slightly less than the diameter of the central portion 32 of the T-shaped connector. In this manner, the resilient clips will securely hold the T-shaped connector. A second set of resilient clips 58, 60 is provided with a space 62 between the sets of clips 54, 56 and 58, 60. The two sets of resilient clips, which are similar in construction, will hold the T-shaped connector on either side of the stem 36, permitting the stem to extend therebetween in the space 62.

Recesses 64, 66 are formed in the rear wall 50 laterally on both sides of the resilient clips. The length of each recess along line 68 is slightly larger than the length of an airstone. On the other hand, the width of each recess along line 70 is slightly less than the width dimension or diameter of the airstone. An arcuate cut out 72 is formed in the rear wall extending from each recess toward the resilient clips in order to accommodate the bell shaped ends 34 of the T-shaped connector.

With the airstone arrangement held in place by means of the resilient clips, each airstone will be able to float in an associated recess, as best shown in FIG. 8. The edge wall opening 74 of the recess is noted to provide sufficient room for a portion of the airstone to enter into the recess, where the resilient clips position the diameter of the airstone in front of the recess, so that it effectively floats on all sides, being held on the package by means of the T-shaped connector. In this manner, although securely held in place by means of the connector, the airstone is prevented from breaking or chipping.

It is noted, that the side walls 53 act as spacers for stacking one package on top of another package during shipment thereof so that the sets of airstones mounted on the rear walls 50 are not in contact with each other.

The resilient clips can be formed integrally of the rear wall with the openings 76 formed and defined between the resilient clips of each set. The package shown in FIG. 7 can be extended to retain a plurality of such airstone arrangements, each positioned one beneath the other in a column along the package. The upper portion 78 can contain advertising material describing the airstones. A stand (not shown) can be included in back of the package so that the package can be held in an upright fashion for display during sale thereof after it has been shipped.

It will be appreciated that the airstone arrangement as shown can therefore be utilized singularly or in pairs, and can be used by itself or in conjunction with a complete filtering arrangement. Although in most cases no additional weights are needed, especially when the pair is utilized together, when used singuarly, additional weights may be needed or it can be incorporated within a filtering system to provide sufficient weight.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. An aquarium device for use in an aquarium tank, said device comprising two airstones each having a nozzle extending therefrom, a connector having a tubular central portion for receiving said nozzles therein through respective outer ends thereof, and a tubular stem portion extending from said central portion for coupling to an air hose, said central and stem portions being connected to provide a T-shaped connector, whereby air entering said tubular stem portion is directed to both airstones.

2. An aquarium device as in claim 1, wherein said tubular stem portion is frustroconical in shape, and wherein each of said nozzles includes a frustroconical stem section substantially identical in shape to said tubular stem portion, whereby each airstone can be individually coupled directly to the air hose.

3. An aquarium device as in claim 2, wherein each of said airstones has a bore provided therein, and wherein each of said nozzles includes a cylindrical portion inserted in said bore, said frustroconical stem extending outwardly from said cylindrical portion.

4. An aquarium device as in claim 1, wherein a portion of each of said nozzles is inserted within their respective airstones, an inserted end of each of said nozzles having an axially extending slot therethrough.

5. An aquarium device as in claim 1, wherein a portion of each of said nozzles is inserted within their respective airstones, and further comprising an adhesive collar disposed around each of said nozzles and against their respective airstones for securing said nozzles to their respective airstones.

6. An aquarium device as in claim 5, wherein each said adhesive collar is of a plastic, wet-proof material.

7. An aquarium device as in claim 5, wherein said central portion of said T-shaped connector includes opposed bell shaped ends for covering said collars.

8. An aquarium device as in claim 1, wherein said airstones are cylindrical in shape.

9. An aquarium device as in claim 8, and further comprising a package for retaining at least one aquarium device, said package including a rear wall, resilient clips upwardly extending from said rear wall, said clips being spaced apart from each other by a dimension slightly less than the diameter of the tubular central portion of said T-shaped connector, recesses provided in said rear wall laterally on both sides of said resilient clips, the length of said recesses being greater than the length of said airstones, and the width of said recesses being less than the diameter of said airstones, said tubular central portion of said T-shaped connector being supported between said clips on said rear wall with said airstones floating in said recesses.

10. An aquarium device as in claim 9, wherein said central portion includes opposed bell shaped ends, and wherein said rear wall of said package includes arcuate cutouts extending from said recesses in a direction towards said clips for accommodating said bell shaped ends.

11. An aquarium device as in claim 9, wherein said resilient clips are integrally formed with said rear wall.

12. An aquarium device as in claim 9, wherein there are two pairs of laterally spaced apart resilient clips for said central portion of said T-shaped connector, the lateral spacing between said two pairs of clips accommodating said tubular stem portion of said T-shaped connector which extends from said central portion thereof.

13. An aquarium device as in claim 1, wherein said airstone is formed of sand bonded together under heat and/or pressure with adhesive material.

14. An aquarium device as in claim 1, wherein said nozzle is formed of styrene acrilonitrile.

15. An aquarium device as in claim 1, wherein said T-shaped connector is formed of acrilonitrile butediene styrene.

* * * * *